(12) United States Patent
Ferlitsch

(10) Patent No.: US 8,164,785 B2
(45) Date of Patent: Apr. 24, 2012

(54) METHOD AND APPARATUS FOR SELECTING PRINTING DEVICES ACCORDING TO RESOURCE AVAILABILITY

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1921 days.

(21) Appl. No.: 10/869,793

(22) Filed: Jun. 15, 2004

(65) Prior Publication Data

US 2005/0275852 A1  Dec. 15, 2005

(51) Int. Cl.
*H04N 1/00* (2006.01)
*G06F 3/12* (2006.01)

(52) U.S. Cl. .......................... 358/1.6; 358/1.15

(58) Field of Classification Search .............. 358/1.11, 358/1.15, 1.16, 1.17; 710/15, 16
See application file for complete search history.

(56) References Cited

U.S. PATENT DOCUMENTS

| | | | |
|---|---|---|---|
| 5,220,674 A * | 6/1993 | Morgan et al. ............... 709/223 |
| 5,239,625 A | 8/1993 | Bogart et al. |
| 5,337,258 A * | 8/1994 | Dennis ........................ 714/47 |
| 5,446,837 A | 8/1995 | Motoyama et al. ........... 395/145 |
| 5,467,432 A | 11/1995 | Ota |
| 5,469,533 A * | 11/1995 | Dennis ........................ 358/1.15 |
| 5,511,149 A | 4/1996 | Hayano |
| 5,528,374 A | 6/1996 | Matias |
| 5,528,742 A * | 6/1996 | Moore et al. ................. 715/205 |
| 5,548,740 A * | 8/1996 | Kiyohara ..................... 345/543 |
| 5,566,278 A | 10/1996 | Patel et al. |
| 5,579,087 A | 11/1996 | Salgado |
| 5,600,762 A | 2/1997 | Salgado |
| 5,652,711 A | 7/1997 | Vennekens |
| 5,697,040 A | 12/1997 | Rabjohns et al. |
| 5,706,410 A | 1/1998 | Bagley et al. |
| 5,754,748 A | 5/1998 | Rivers et al. |
| 5,767,978 A | 6/1998 | Revankar et al. |
| 5,793,937 A | 8/1998 | Chura et al. |
| 5,796,411 A | 8/1998 | Cyman et al. |
| 5,835,098 A * | 11/1998 | Lipton ........................ 345/589 |
| 5,859,711 A | 1/1999 | Barry et al. |
| 5,873,659 A | 2/1999 | Edwards et al. |
| 5,923,013 A | 7/1999 | Suzuki et al. |
| 5,940,581 A * | 8/1999 | Lipton ........................ 358/1.11 |
| 5,960,113 A | 9/1999 | Evan et al. |
| 5,960,166 A | 9/1999 | Brown, III et al. |
| 5,966,503 A | 10/1999 | Van Vliembergen |
| 5,978,560 A | 11/1999 | Tan et al. .................... 395/114 |
| 5,978,563 A | 11/1999 | Kawamoto et al. |
| 6,027,268 A | 2/2000 | Bischel et al. |
| 6,046,748 A | 4/2000 | Horowitz et al. |
| 6,049,390 A | 4/2000 | Notredame et al. |
| 6,052,198 A | 4/2000 | Neuhard et al. |
| 6,097,498 A | 8/2000 | Debry et al. |

(Continued)

FOREIGN PATENT DOCUMENTS

EP    0704791    4/1996

(Continued)

*Primary Examiner* — James A Thompson
*Assistant Examiner* — Mesfin Getaneh
(74) *Attorney, Agent, or Firm* — Stolowitz Ford Cowger LLP

(57) ABSTRACT

Printing devices are selected from a printing pool at least partially based on what non-resident resources need to be downloaded to the printing devices for printing the print job. The printing device selection can also include other types of printer selection criteria.

18 Claims, 15 Drawing Sheets

U.S. PATENT DOCUMENTS

| | | |
|---|---|---|
| 6,185,632 B1 | 2/2001 | Berkema |
| 6,219,151 B1 | 4/2001 | Manglapus et al. |
| 6,246,487 B1 | 6/2001 | Kobayashi |
| 6,272,501 B1 | 8/2001 | Baumann |
| 6,295,133 B1 | 9/2001 | Bloomquist et al. |
| 6,327,050 B1 | 12/2001 | Motamed et al. |
| 6,331,896 B1 | 12/2001 | Morita |
| 6,348,971 B2 * | 2/2002 | Owa et al. ............... 358/1.15 |
| 6,359,698 B1 * | 3/2002 | Kawaguchi ............... 358/1.16 |
| 6,400,467 B1 | 6/2002 | Harrington |
| 6,453,129 B1 | 9/2002 | Simpson et al. ............ 399/23 |
| 6,459,498 B2 | 10/2002 | Miyake et al. |
| 6,490,055 B1 | 12/2002 | Shimizu |
| 6,498,656 B1 | 12/2002 | Mastie et al. ............. 358/1.15 |
| 6,549,947 B1 | 4/2003 | Suzuki |
| 6,604,805 B2 | 8/2003 | Nguyen et al. |
| 6,611,880 B1 * | 8/2003 | Simpson et al. ............ 710/18 |
| 6,633,396 B1 | 10/2003 | Barry et al. |
| 6,657,741 B1 * | 12/2003 | Barry et al. ............... 358/1.15 |
| 6,738,153 B1 | 5/2004 | Aschenbrenner et al. |
| 6,774,913 B1 | 8/2004 | Varga et al. |
| 6,809,833 B1 | 10/2004 | Blair et al. |
| 6,819,439 B2 | 11/2004 | Hayashi et al. |
| 6,825,943 B1 | 11/2004 | Barry et al. |
| 6,850,335 B1 | 2/2005 | Barry et al. |
| 6,879,409 B2 | 4/2005 | Motamed et al. |
| 6,930,795 B1 | 8/2005 | Motamed et al. |
| 6,934,046 B1 | 8/2005 | Nishikawa et al. |
| 6,934,047 B2 | 8/2005 | Housel |
| 7,016,061 B1 | 3/2006 | Hewitt |
| 7,072,052 B1 | 7/2006 | Tanahashi et al. |
| 7,099,027 B1 | 8/2006 | Barry et al. |
| 7,143,210 B2 | 11/2006 | Ferlitsch |
| 7,155,672 B1 * | 12/2006 | Adler et al. ............... 715/210 |
| 7,202,964 B2 | 4/2007 | Christiansen |
| 7,236,268 B2 | 6/2007 | Rao et al. |
| 7,242,487 B2 | 7/2007 | Lucivero et al. |
| 7,251,052 B2 | 7/2007 | Ferlitsch |
| 7,262,876 B2 | 8/2007 | Wei et al. |
| 7,265,866 B2 * | 9/2007 | Holmstead et al. ........ 358/1.16 |
| 7,268,910 B2 | 9/2007 | Catt et al. |
| 7,271,928 B2 * | 9/2007 | Naito et al. ............... 358/1.15 |
| 7,298,503 B2 | 11/2007 | Christiansen et al. |
| 7,304,760 B2 | 12/2007 | Ferlitsch |
| 7,352,481 B2 | 4/2008 | Christiansen |
| 7,375,837 B2 | 5/2008 | Ferlitsch |
| 7,411,692 B2 | 8/2008 | Ferlitsch |
| 7,551,299 B2 | 6/2009 | Ferlitsch |
| 2001/0047369 A1 | 11/2001 | Aizikowitz et al. |
| 2002/0001104 A1 | 1/2002 | Shima |
| 2002/0044301 A1 | 4/2002 | Kitazawa |
| 2002/0051241 A1 | 5/2002 | Ogino |
| 2002/0054320 A1 * | 5/2002 | Ogino ....................... 358/1.15 |
| 2002/0057449 A1 | 5/2002 | Chapman et al. |
| 2002/0060801 A1 | 5/2002 | Motamed et al. |
| 2002/0080389 A1 | 6/2002 | Carney |
| 2002/0089687 A1 | 7/2002 | Ferlitsch et al. ........... 358/1.15 |
| 2002/0089688 A1 | 7/2002 | Ferlitsch et al. ........... 358/1.15 |
| 2002/0089691 A1 | 7/2002 | Fertlitsch et al. .......... 358/1.15 |
| 2002/0089692 A1 * | 7/2002 | Ferlitsch .................... 358/1.15 |
| 2002/0097418 A1 | 7/2002 | Chang et al. |
| 2002/0102119 A1 | 8/2002 | Christodoulou et al. |
| 2002/0144162 A1 | 10/2002 | Tada et al. .................. 713/300 |
| 2002/0163664 A1 | 11/2002 | Sugano |
| 2002/0194310 A1 * | 12/2002 | Chu et al. .................... 709/219 |
| 2003/0011805 A1 | 1/2003 | Yacoub ....................... 358/1.15 |
| 2003/0033353 A1 | 2/2003 | Simpson et al. ............ 709/203 |
| 2003/0046454 A1 | 3/2003 | Hoffmann et al. |
| 2003/0053112 A1 | 3/2003 | Motosugi et al. .......... 358/1.14 |
| 2003/0086114 A1 | 5/2003 | Cherry et al. ............... 358/1.15 |
| 2003/0123084 A1 | 7/2003 | Brossman et al. |
| 2003/0133146 A1 * | 7/2003 | Parry ......................... 358/1.15 |
| 2003/0184782 A1 | 10/2003 | Perkins et al. |
| 2003/0184799 A1 | 10/2003 | Ferlitsch et al. ........... 358/1.15 |
| 2003/0184807 A1 | 10/2003 | Tsuchitoi |
| 2003/0189725 A1 | 10/2003 | Kloosterman et al. |
| 2003/0191790 A1 | 10/2003 | Horiyama ................... 709/100 |
| 2003/0231328 A1 | 12/2003 | Chapin et al. |
| 2004/0008366 A1 | 1/2004 | Ferlitsch |
| 2004/0021905 A1 * | 2/2004 | Holmstead et al. ........ 358/1.16 |
| 2004/0190014 A1 | 9/2004 | Ferlitsch |
| 2004/0190042 A1 | 9/2004 | Ferlitsch |
| 2004/0196470 A1 | 10/2004 | Christiansen |
| 2004/0196496 A1 | 10/2004 | Klassen |
| 2004/0218202 A1 | 11/2004 | Josephsen et al. |
| 2004/0225773 A1 * | 11/2004 | Wang et al. ................. 710/200 |
| 2004/0252344 A1 | 12/2004 | Foster et al. |
| 2005/0007632 A1 | 1/2005 | Mizayake et al. |
| 2005/0015779 A1 * | 1/2005 | Christiansen ............... 719/327 |
| 2005/0036173 A1 | 2/2005 | Hayashi et al. |
| 2005/0052700 A1 | 3/2005 | Mackenzie et al. |
| 2005/0068559 A1 | 3/2005 | Ferlitsch |
| 2005/0068562 A1 | 3/2005 | Ferlitsch |
| 2005/0088697 A1 | 4/2005 | Yasutomi et al. |
| 2005/0146742 A1 | 7/2005 | Gregory |
| 2005/0162667 A1 | 7/2005 | Felix et al. |
| 2005/0225789 A1 | 10/2005 | Ferlitsch |
| 2005/0270560 A1 | 12/2005 | Ferlitsch |
| 2005/0275861 A1 | 12/2005 | Ferlitsch |
| 2006/0033958 A1 | 2/2006 | d'Entrecasteaux |
| 2006/0055952 A1 | 3/2006 | Ferlitsch |
| 2008/0052342 A1 * | 2/2008 | Koga .......................... 709/201 |

FOREIGN PATENT DOCUMENTS

| | | |
|---|---|---|
| EP | 0917044 A2 | 5/1999 |
| EP | 1006431 | 6/2000 |
| EP | 1133154 | 9/2001 |
| EP | 0917042 | 7/2004 |
| GB | 2380453 | 4/2003 |
| WO | 9938068 | 7/1999 |
| WO | 0131432 | 5/2001 |
| WO | WO 01/31432 | 5/2001 |

* cited by examiner

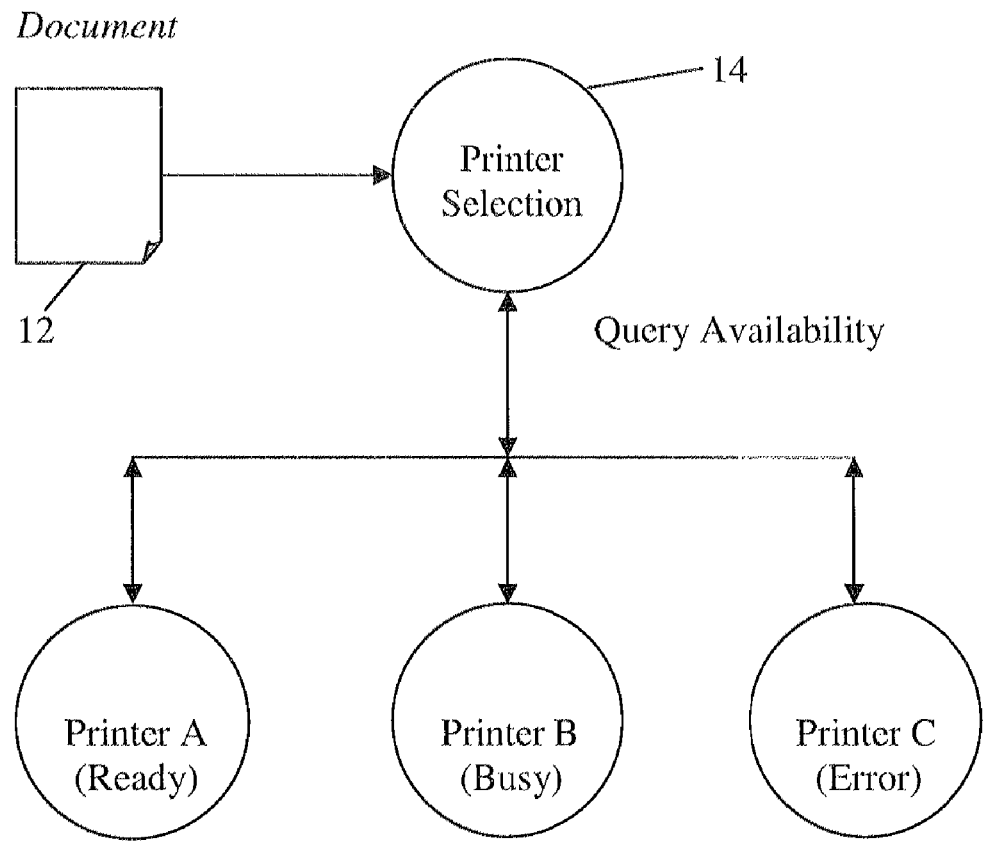
Figure 1a – Prior Art

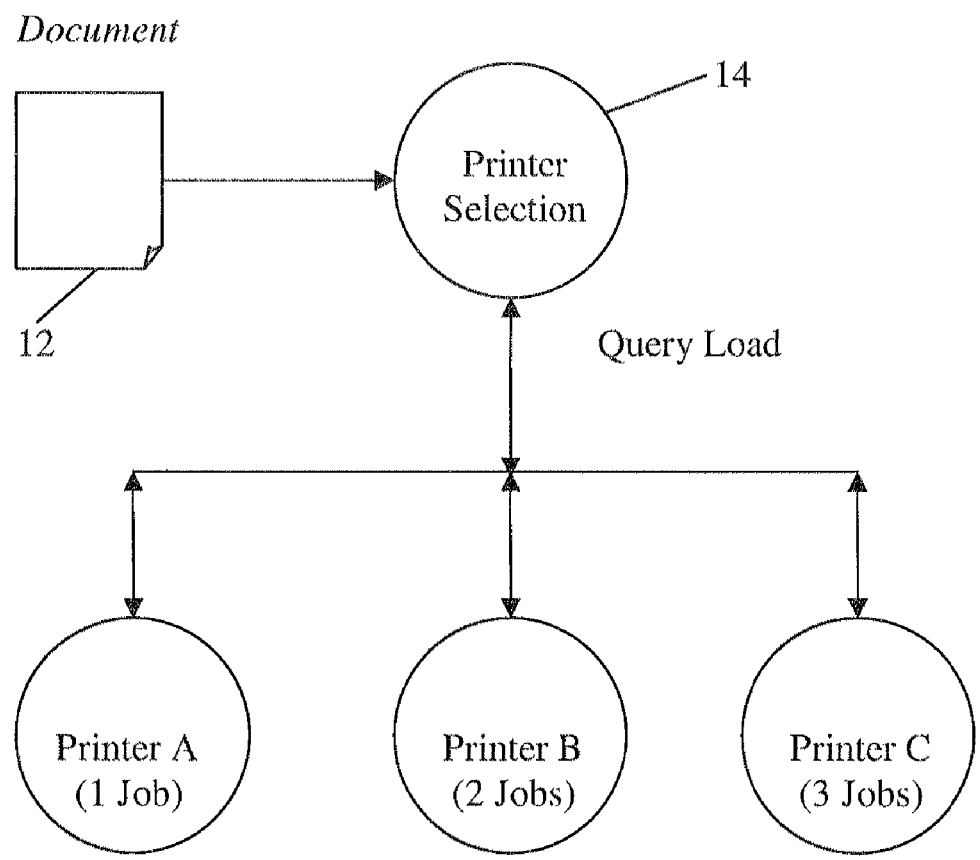
Figure 1b – Prior Art

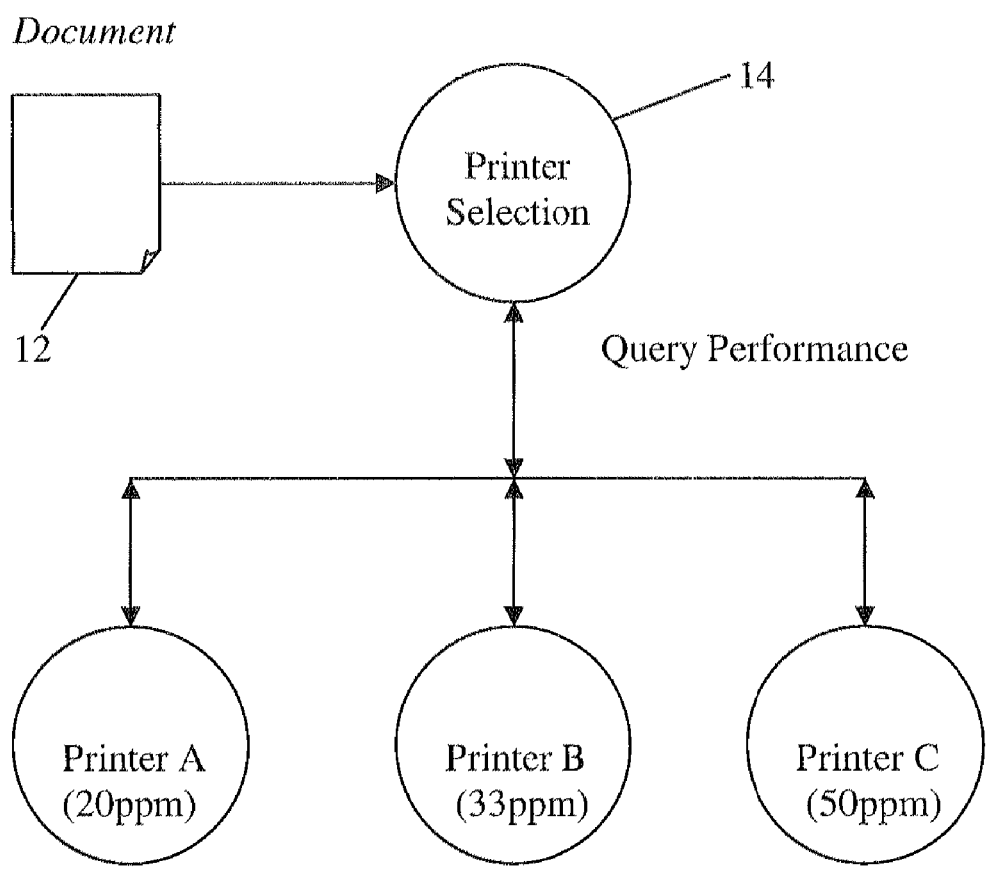
Figure 1c – Prior Art

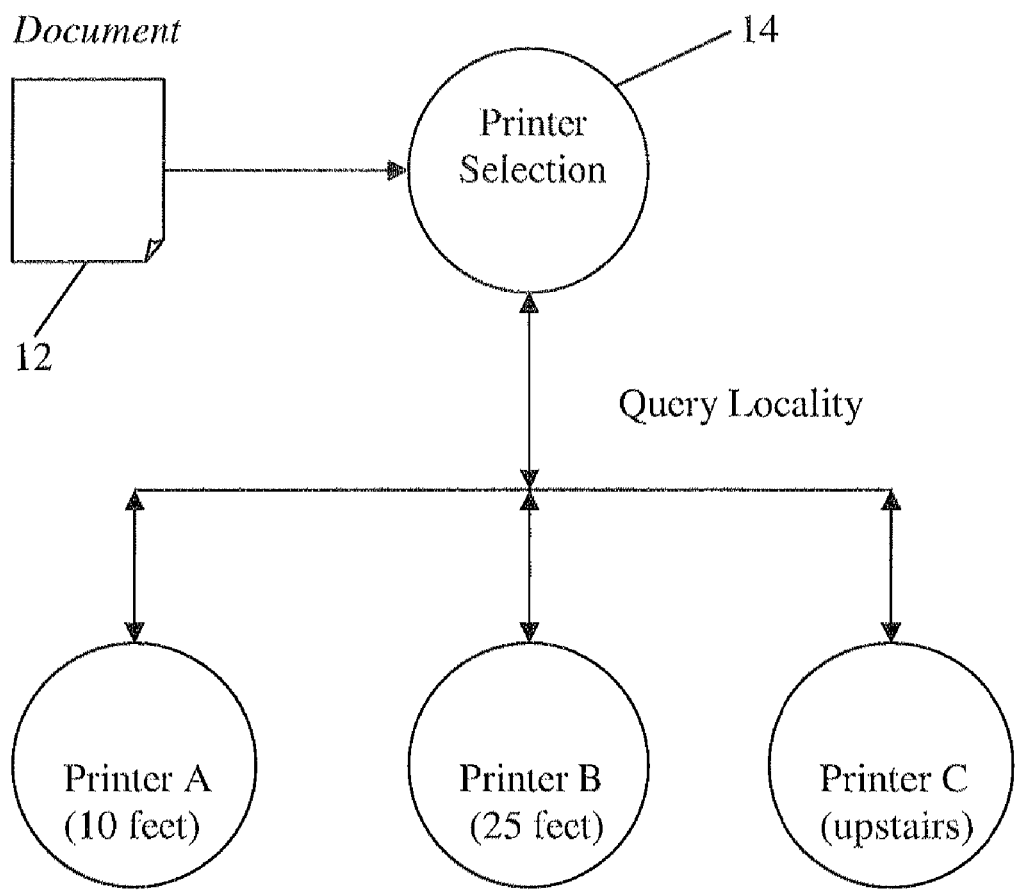
Figure 1d – Prior Art

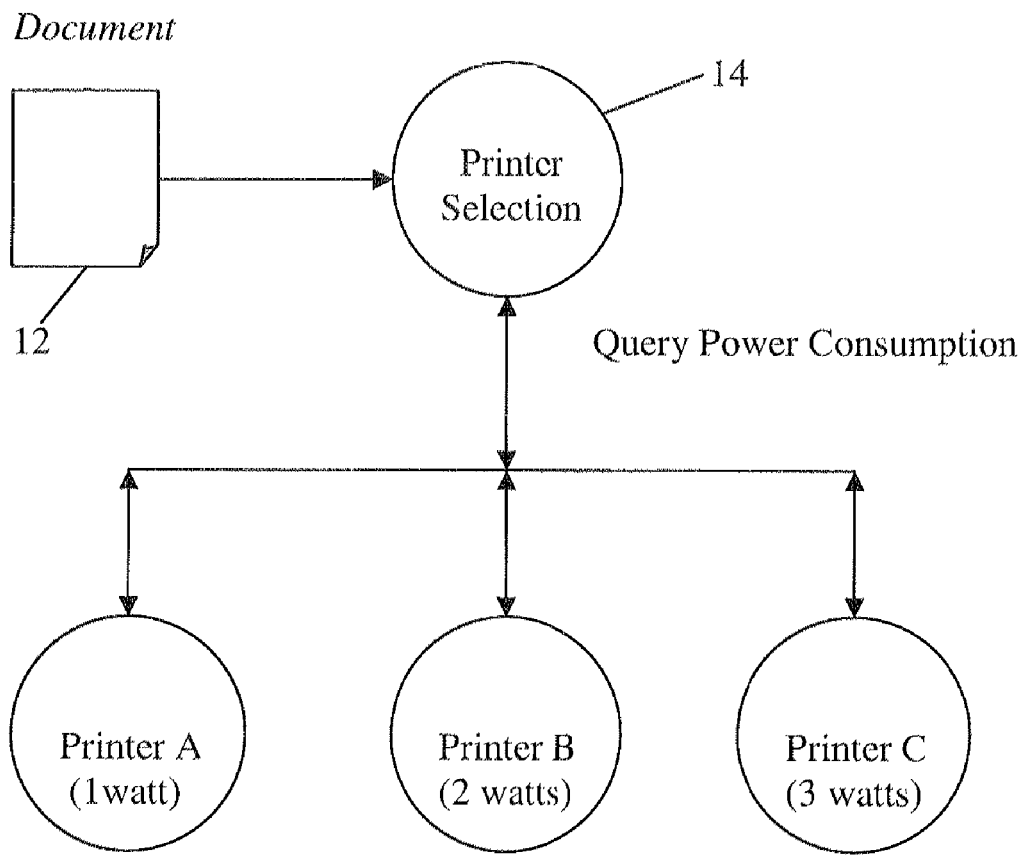
Figure 1e– Prior Art

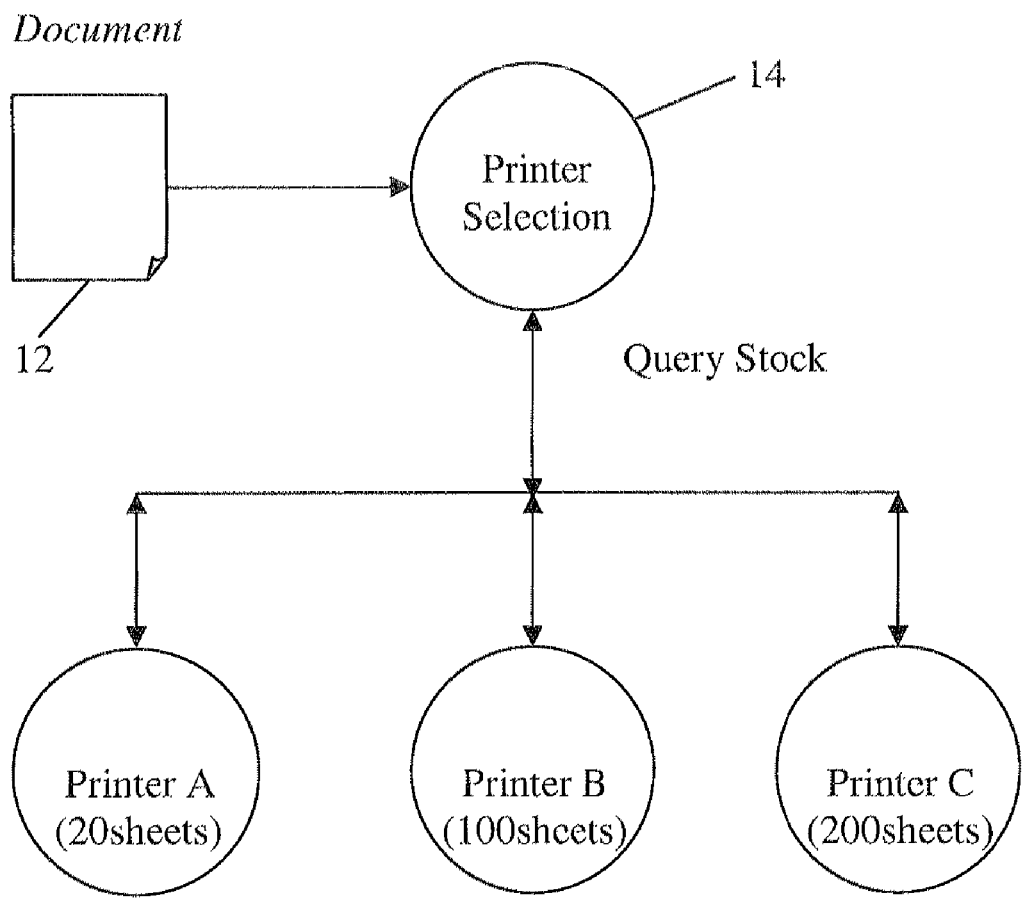
Figure 1f– Prior Art

METHOD AND APPARATUS FOR SELECTING PRINTING DEVICES ACCORDING TO RESOURCE AVAILABILITY

BACKGROUND

Users in high volume print environments continue to have an increasing demand for reliable and more immediate output. Generally, this need is handled by printer pooling, where the user sends the print job to a logical printer which is associated with multiple physical printers. The logical printer implements a printer selection process that selects one or more of the physical printers that are sent the print job.

Referring to FIG. 1A, a printer selection process 14 is based on printer availability. In one example, printers A-C are classified as either in a ready, busy or error state. A print job for document 12 is routed according to the afore-mentioned preference order. For example, the Ricoh Smart Monitor® implements this form of availability using a custom port monitor and querying the device to determine device status.

The Microsoft Windows NT/2K and XP® operating systems implement a similar form of availability using a port monitor. For Windows NT/2K® printer pooling, the printers are classified as ready or busy by querying a local spooler, and the print job is routed according to the afore-mentioned preference order. In Windows XP® printer pooling, the printers are classified by querying the device using Simple Network Management Protocol (SNMP), and the print job is routed according to the afore-mentioned preference order.

Printer pooling by availability may also be used to restart a failed print job on an alternate printer, such as by having a print subsystem component (e.g., print processor, print spooler or port monitor) monitor the completion of a print job after it has been routed to a printer. If the print job fails to complete without error, the print subsystem component restarts the job on the next available printer in the pool.

In another example of availability, an estimate is made when each printer in the pool will become available when all the printers are currently busy printing. The printer that is estimated to be the first to become available is selected as the most available printer. In another example of availability, an idle printer is further distinguished between power save mode and powered up. A printer in power save mode needs additional time to warm up and therefore is less available than a powered up printer.

In FIG. 1B, the printer selection process 14 is based on the load on printers A-C. In one example, the load on each printer A-C is quantified and the print job is routed to the printer with the least load. For example, the number of jobs currently printing/pending on the printers may be used as a load measurement and saturation level.

FIG. 1C shows another scheme where the printer selection process 14 is based on performance of printers A-C. In one example, the performance of each printer A-C is determined as the printer's rated pages per minute (ppm), and a print job for document 12 is routed to the printer A-C with the highest rated performance.

FIG. 1D shows a scheme where the printer selection process 14 for printing document 12 is based partially on locality of printers A-C. In one example, the location of the printers A-C relative to the device conducting the printer selection process 14 is determined. The printer selection process 14 may then route the print job by ranking printers according to how well they match the print preferences such as speed, quality, Black and White (BW) vs. color, Page Description Language (PDL) and distance from the issuer.

FIG. 1E shows another technique where the printer selection process 14 for printing document 12 is based on power consumption of printers A-C. In one example, the power consumption of each combination of devices (e.g., printer and finisher) required to complete the print job is determined. The print job is then routed to the combination that consumes the least amount of power.

FIG. 1F shows another scheme where the printer selection process 14 for document 12 is based on consumable availability. In this example, the amount of consumables is determined for items such as paper stock and toner. The print job is then routed to the printer A-C with sufficient consumables to process the print job.

SUMMARY OF THE INVENTION

Printing devices are selected from a printing pool at least partially based on what non-resident resources need to be downloaded to the printing devices for printing the print job. The printing device selection can also include other types of printer selection criteria.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIGS. 1A-1F are diagrams showing prior art criteria used for selecting printing devices from a printer pool.

DETAILED DESCRIPTION

A printer selection process considers the availability of device resident resources required by a print job when selecting a printer from a printer pool. Device resident resources include but are not limited to software or electronic resources or any other electronic data required in addition to the print data itself for printing a print job. For example, print resources can include, but are not limited to, fonts, forms, overlays, watermarks, logos, half-tone patterns, color profiles, color calibration, biometric information, and digital signatures, etc.

The length of time for a printer to receive and output a print job is dependent on a number of factors, such as the printer speed and complexity of the print job. However, other factors effecting the time required to complete a print job involve the size of the print job both as its transmitted over the network and the footprint it holds in the memory/storage of the printing device.

One of the size factors involves resources that have to be downloaded with the print job, such as a font set. These resources can be rather large. For example, a Helvetica font set may include a bit map for every letter, punctuation, etc. and possibly a separate bit map for every font size. Some printers may have some or all of the resources required by the print job (device resident resources) while other printers may not have any of the required resources.

A printer selection process chooses which printer in the printer pool to send the print job to by comparing the resources for the print job with the resident resources of the printers. An accumulative byte tally is maintained for the total download byte size of all the resources that would need to be downloaded to each printing device. The printer selection process then ranks the printers according to their required total required download resource byte size. For example, the printer with the lowest required download byte size may be given the highest ranking and the printer with the highest required download byte size may be given the lowest ranking.

The printer selection process then uses this ranking along with possibly other printer selection factors, such as availability, performance, locality, load, capabilities, consumables, etc. to direct the print job, or portions of the print job (e.g., job splitting) to one or more printing devices.

Print Job Separation

Figure 2A:
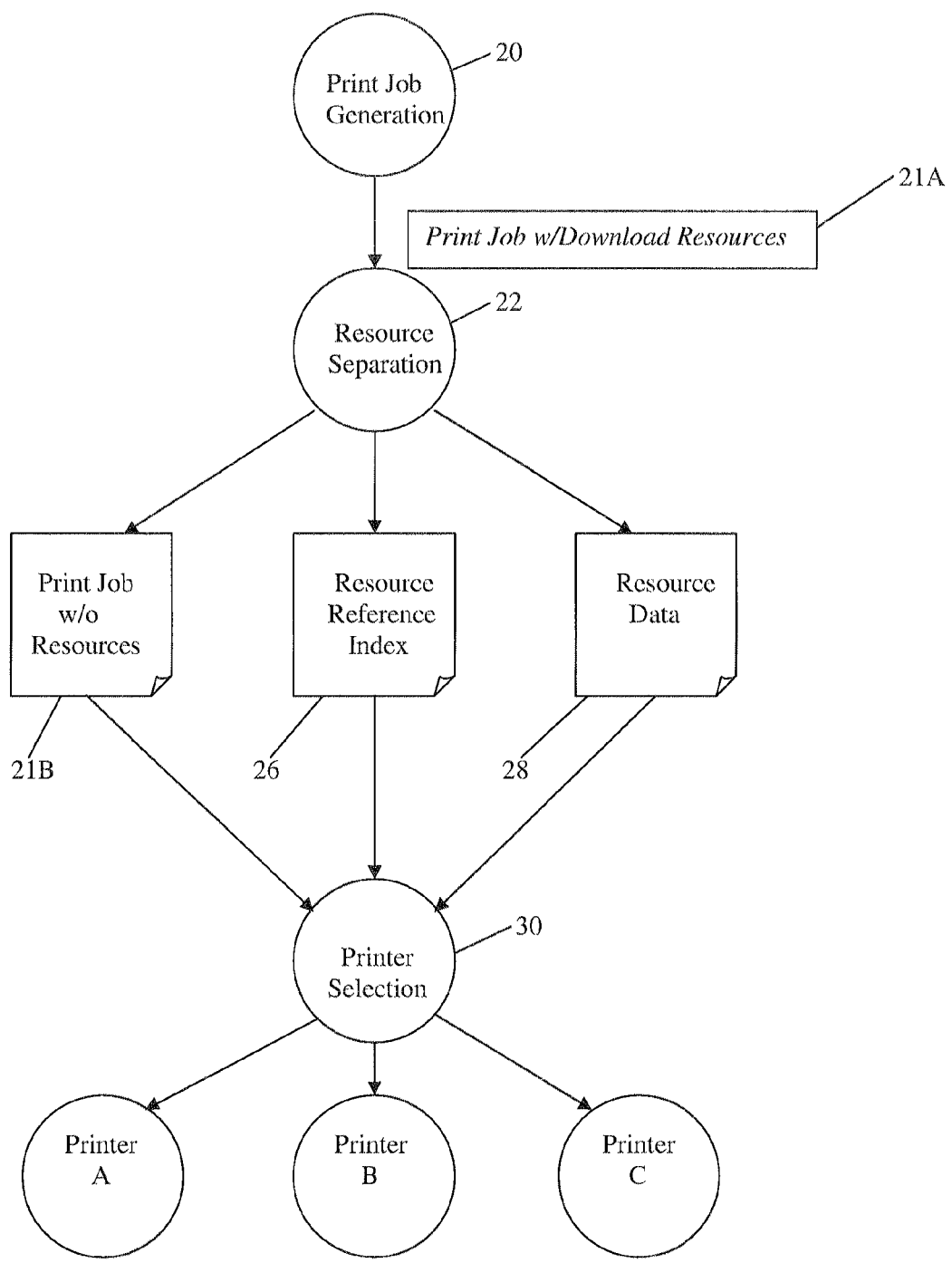
FIG. 2A is a block diagram showing how printer selection is based on what resources need to be downloaded to the printers.

FIG. 2A shows how a print job 21A is separated into print data and candidate downloadable resources required by the print job. Examples of downloadable resources include but are not limited to font sets, forms, overlays, watermarks, logos, half-tone patterns, color profiles, color calibration, biometric information, and digital signatures. In this example, a print generation process 20 generates the print job 21A that includes all the resources which the print generation process 20 assumes may not be resident in the printing devices A-C. In an alternate embodiment, the print generation process 20 assumes that all the resources are resident in devices A-C. In this alternate embodiment, the print job 21A includes no resources and only references or links to the resources.

The print job generation system 20 can include any software application that generates a document, image, etc. that is then output for printing as a print job. For example, a Microsoft (MS) Word program may translate a MS Word document into device independent printing instructions using a graphics engine like the Graphic Display Interface (GDI) as input to a printer driver in MS-Windows which may then generate the print job 21A for the document when a print command is selected in MS Word. Of course the print job generation system 20 in FIG. 2A can be any type of electronic application, printer driver, print data transform function (e.g., IBM AS/400 Host Print Transform (HPT)), or any other type of program that generates the print job 21A.

A resource separation process 22 downstream from the print generation process 20 parses and separates the print job 21A into a print job without embedded resource data 21B, resource data 28, and a resource reference index 26 identifying the embedded resources that need to be downloaded to the selected printing device. For example, the resource reference index 26 may identify an Arial font and a medical form that were used in the print job 21A. In an alternate embodiment, the resource separation process 22 may include in the resource reference index 26, resources referenced by the print job 21A but whose resource data 28 is not embedded (e.g., assumed to be device resident) in print job 21A. In this case, the resource data 28 is obtainable from another source (not shown), such as a central resource repository.

This separation process may occur by any means. For example, a parser in resource separation process 22 identifies and separates the resource data commands 28 from the rest of the print data in the print job 21A. It is well known how to parse commands from a computer language such as PCL or Post script (PS) and therefore the parsing process is not described in further detail. However, parser requirements for parsing a print job can be obtained in the following publications which are herein incorporated by reference. HP PCL/PJL Reference, Printer Job Language Technical Reference, 11th Edition (1999); HP PCL Printer Language Technical Reference Manual, 1st Edition (1992); Adobe Postscript® Language Reference Manual, 3rd Edition; Adobe PDF Reference Manual v1.4, 3rd Edition; and TIFF Revision 6, June 1992, Adobe Systems.

The resource separation process 22 may occur upstream from a printer selection process 30, may be part of the printer selection process 30, or may be a combination of the two. The resource separation process 22 may also occur in one or more passes. In a one pass separation process, the resource data 28 may be separated from the rest of the print job 21B prior to the printer selection process 30. In a two pass separation process, a first pass prior to the printer selection process 30 generates the resource reference index 26 without separating out the resource data 28. The second pass is performed after the printer selection process 30. The second pass removes the subset of embedded resource data resident on the selected printing device A-C from the print job leaving only the resource data not resident in the selected printing device A-C.

Figure 2B:
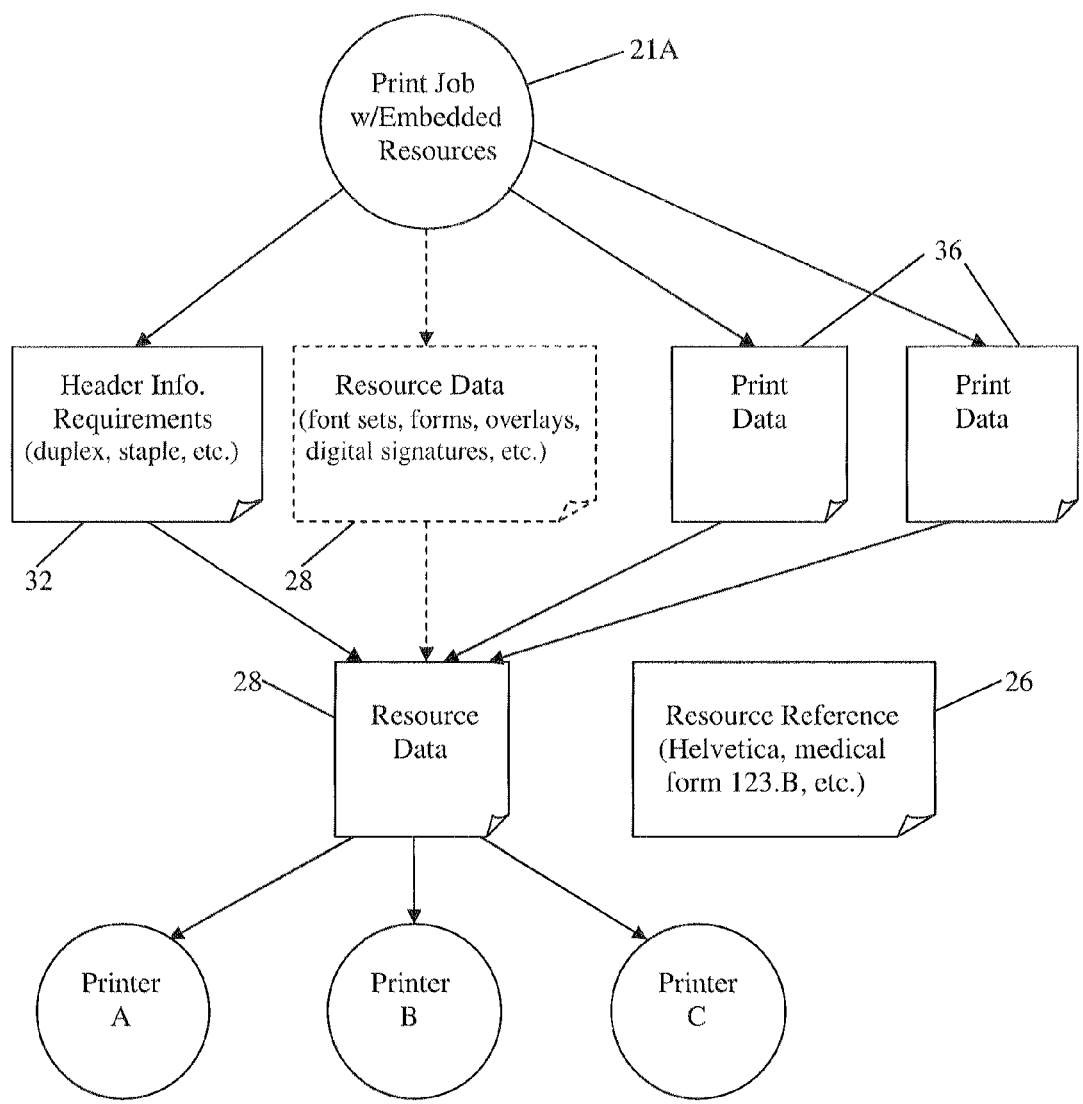
FIG. 2B is a diagram showing an example data structure for a print job.

FIG. 2B shows one example of a general data structure for the print job 21A with embedded resources 28. The print job 21A includes header information 32 that specifies print requirements such as duplex, staple, etc. Resources 28 specify the font set, forms, overlays, watermarks, logos, half-tone patterns, color profiles, color calibration, biometric information, and digital signatures, etc. for the print job 21A. The print data 36 comprises the text, drawings, images, or any other electronically generated data that needs to be printed.

The resources 28 are separated from the rest of the print job 21A and the resource reference index 26 is generated identifying the different type of resources that are in resource data 28. The printers A-C are then analyzed to determine which of the printers has the largest amount of resident resources corresponding to resources 28. One of the printers A-C is then selected, in addition to possibly other factors, according to which printer has the large amount of resident resources. In other words, according to which printer A-C would require the least amount of resource downloading.

In other embodiments, the printers A-C are further analyzed to determine the time to accessibility of a resource when the resource data 28 is a device resident resource, such as whether the resource is in RAM, flash, hard-drive or cartridge.

The data structure shown in FIG. 2B is for illustrative purposes and can differ for different types of print jobs. For example, other print jobs may have the resources 28 interspersed throughout the print data 36. Formats for the print job 21A are known to those skilled in the art and are described in further detail in references such as the following: HP PCL/PJL Reference, Printer Job Language Technical Reference, 11th Edition (1999); HP PCL Printer Language Technical Reference Manual, 1st Edition (1992); Adobe Postscript® Language Reference Manual, 3rd Edition; Adobe PDF Reference Manual v1.4, 3rd Edition; and TIFF Revision 6, June 1992, Adobe Systems, which are herein incorporated by reference.

When the print job 21A is generated, the print job generation process 20 can assume the printer has no resident resources, some subset of required resident resources, or all necessary resident resources. With the first assumption that the printer has no resident resources, the print job generation process 20 packs every required resource into the print job 21A. With the second assumption, the print job generation process assumes that the printer may have some subset of resident resources and generates a print job 21A containing some subset of required resources. These two embodiments are shown above in FIGS. 2A and 2B.

Figure 2C:
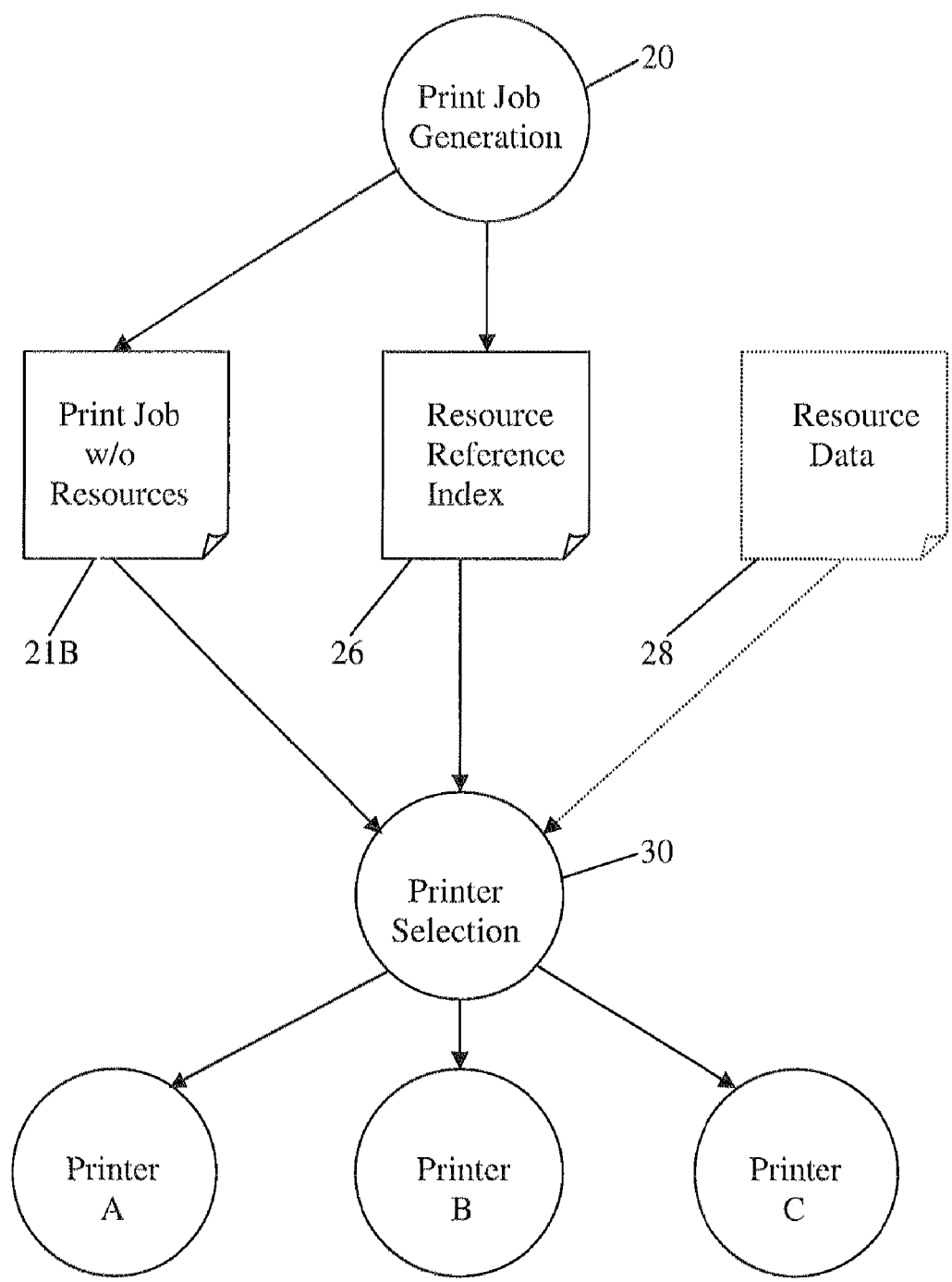
FIG. 2C is a diagram showing how a print job is generated without resources.

If it is assumed that the printer has all the required resident resources, the print job generation process 20 may not put any resources into the generated print job 21A. This is shown in FIG. 2C. While there is no resource separation process 22 as shown in FIG. 2A, the print job without resources 21B is still parsed to generate the resource reference index 26 that identifies what resources are referenced in the print job 21B.

The corresponding resource data 28 not resident in the printing device may be stored anywhere, such as on a client generating the print job 21B, on a server, or on offline storage. The non-resident resource data 28 may be downloaded into the selected printing device as part of the print job 21B by the client, via a server process or pulled by the selected printing device. As mentioned above, the printer selection process 30 can also supplement or use the resource download requirements for the printing devices in combination with other printer selection criteria, such as printer availability, consumables, performance, hardware capabilities, etc.

Figure 2D:
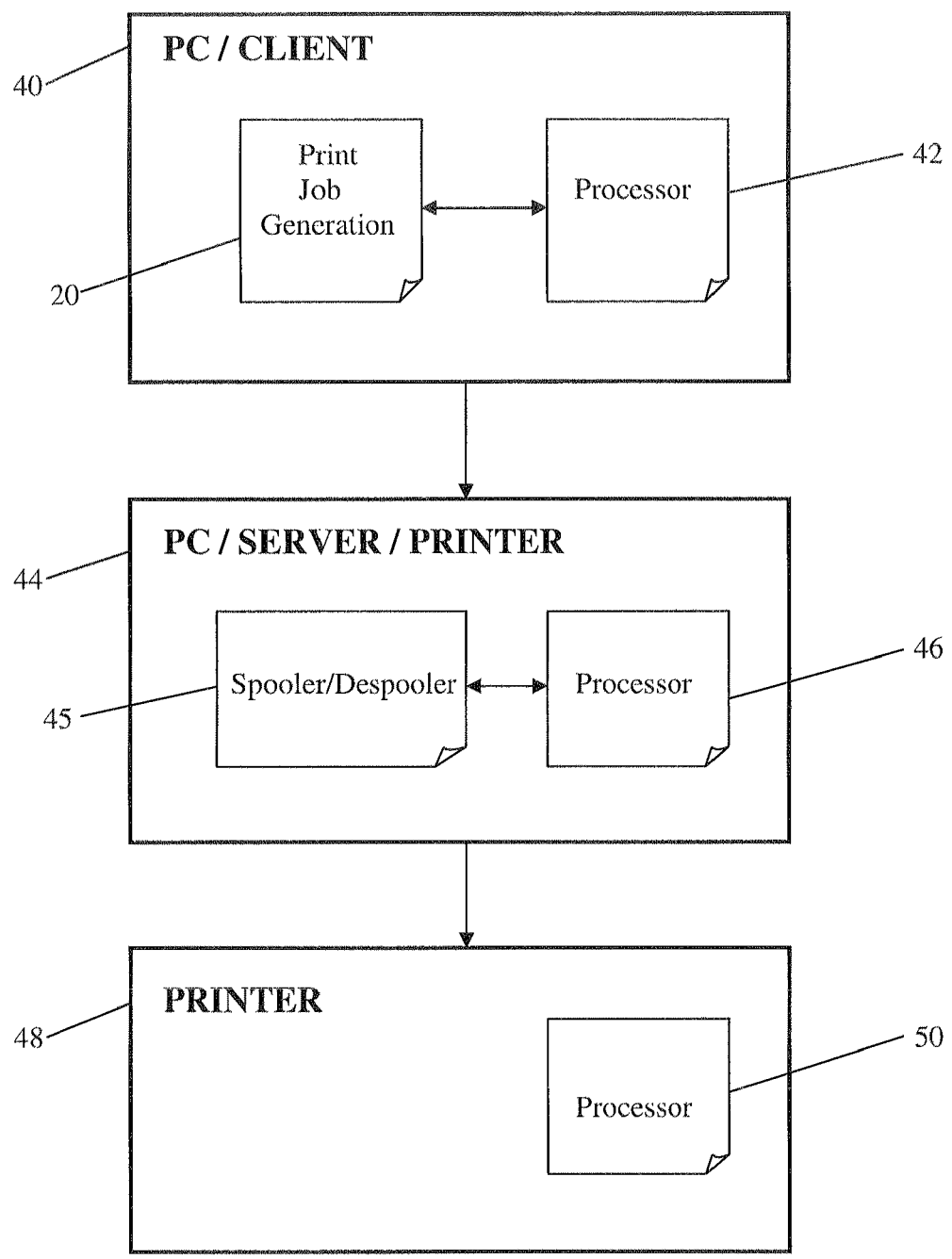
FIG. 2D is a diagram of a printing system that selects printing devices according to resource download requirements.

FIG. 2D shows one example of a printer generation system used for conducting the resource separation and printer selection operation described above. The print job generation process 20 is generally performed in a Personal Computer (PC) or other computing device alternatively referred to as a client 40. The client 40 has a processor 42 that runs application software and a printer driver 20 that generates the print job.

The print job is then generally sent to a spooler/despooler operation 45 that in one embodiment is software that runs on a processor 46. The spooler/despooler operation 45 can be conducted in the client 40, in a separate server 44, or in a printer 48. Each of the client 40, server 44, and printer 48 comprise a memory 41, 43, and 47 respectively. In other printer systems the spooler/despooler operation 45 may be distributed among multiple different connected computing devices. A spooler function manages the print jobs by creating a print job queue and then deciding when to hand off the print jobs to one or more printers 48. A despooling function then delivers the print jobs and confirms that the print jobs are successfully printed. The printer 48 receives the print job and has a processor 50 that prints out the print data 36 (FIG. 2B) for the print job according to any resource data and other header information associated with that print job.

In one embodiment, the resource separation and associated printer selection is implemented in software that is run by one or more of the processors in devices 40 or 44 anywhere in the printing process after print job generation 20. In another embodiment, the resource separation and associated printer selection may be implemented in some first printing device 48, which then performs the afore-mentioned processing and re-routes the print job 21B to a second printing device 48. In yet other embodiments, print job 21B may be further split (i.e., job splitting) into independent sub-jobs, where each independent sub-job is routed to one or more different printing devices 48 according to the resource availability, and possibly other factors.

Obtaining Availability of Device Resident Resources

Figure 3:
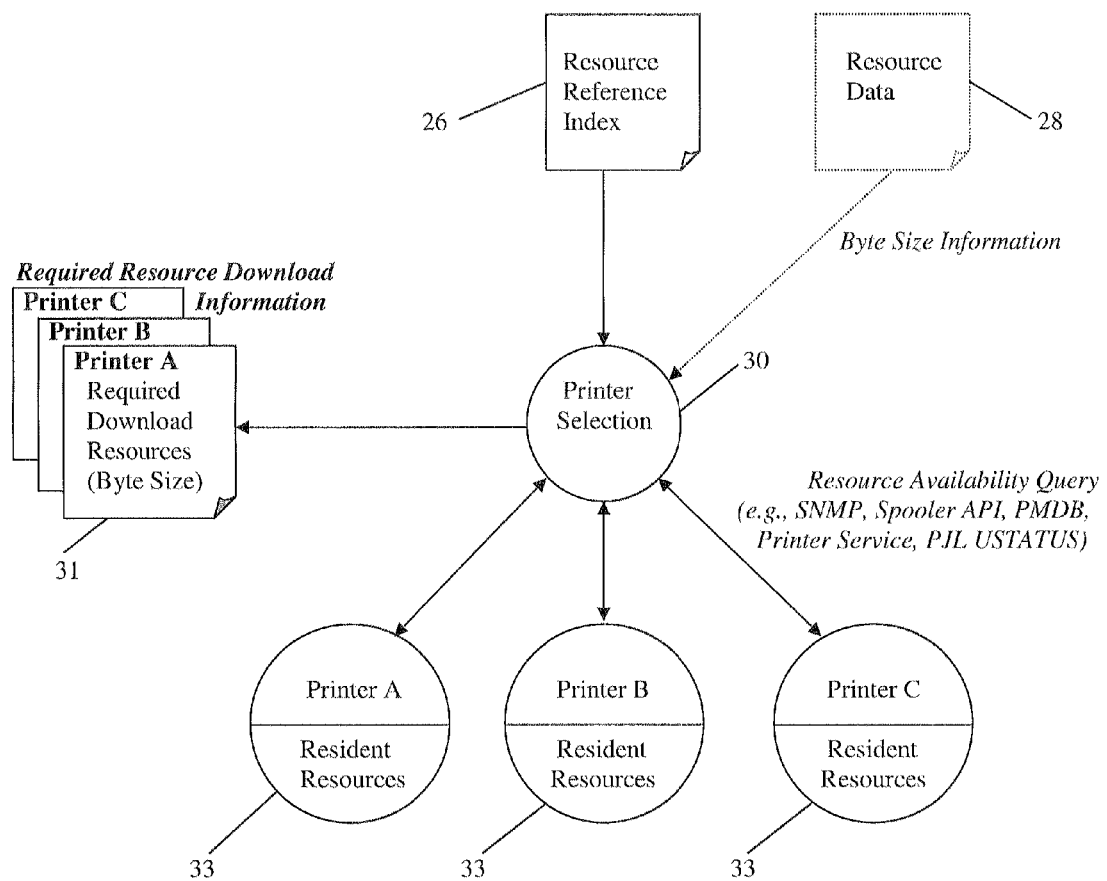
FIG. 3 is a diagram showing how to determine printer download requirements.

FIG. 3 shows how the printer selection process 30 cross references the resources required by the print job with the resident resources 33 in the printing devices A-C. The resources required by the print job are identified in the resource reference index 26. The resident resources 33 in the printing devices A-C are obtained using conventional means. For example, the resident resources 33 can be obtained using Simple Network Management Protocol (SNMP) to query a Resource Management Information Base (MIB); querying the physical printing device to obtain a list of downloaded resources using Extended Markup Language (XML); querying the physical printing device using a pseudo print job, such as using PJL USTATUS INFO to obtain a response containing a list of device resident resources; querying the local or network spooler to obtain device resident resources, which were identified as part of configuring the logical printer associated with the printer device; querying a printer or resource service which maintains information on what resources are resident on what devices; or querying a printer model database to obtain standard and add-on resource options to the device.

The cross referencing process produces an output 31 for each printing device A-C that identifies the resources required by the print job that are not resident on that device and the total byte size of the non-resident resource data.

Printer Ranking by Device Resident Resource Availability

Figure 4:
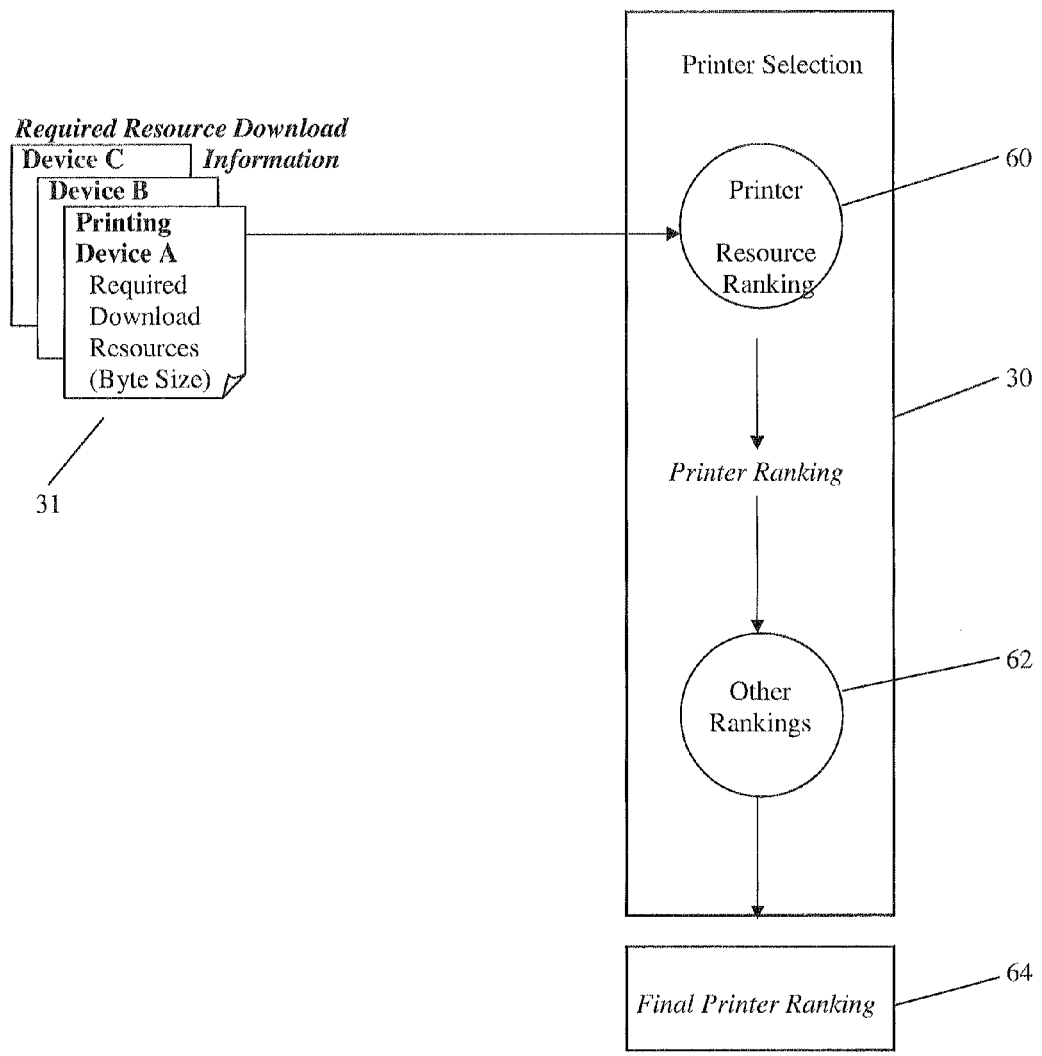
FIG. 4 is a diagram showing how printers are ranked according to resource download requirements.

FIG. 4 shows the required resource download information 31 for each printing device A-C and the total byte size of the required resource download. In one example, the printer with the smallest byte size in information 31 is given the highest ranking and the printer with the largest byte size is given the lowest ranking. For example, download information 31 may indicate that printing device A only needs to download one non-resident resource and printing device B has to download two non-resident resources 28. However, the byte size of the one non-resident resource that has to be downloaded to printing device A may be larger than the combined byte size of the two non-resident resources that have to be downloaded to printer B. In this case, printing device B may be given a higher ranking in the printer resource ranking 60 than printing device A.

It is possible that the printer resource ranking 60 may not be based only on byte size of the required resource download. For example, a particular resource that has to be loaded may be located on a server or other device that is currently busy. In this situation the printer resource ranking 60 may rank a second printer higher if the resources that need to be downloaded for the second printer can be downloaded faster than the resources for the first printer.

This printer resource ranking 60 may also be combined with any other rankings 62 to produce a final ranking 64 for selecting the preferred printer (such as in pool printing) or printers (such as in job splitting). Other forms of ranking 62 include, but are not limited to:

Device Availability (e.g., ready, busy, error)
Device Load (e.g., proportion of work assigned to a device of total current print load).
Device Performance (e.g., rated ppm)
Device Capabilities (e.g., duplex, stapling, etc).
Device Locality (e.g., distance from issuer).
Consumables (e.g., paper, toner supply).
Cost (e.g., how much would be charged for the job).

In other embodiments, the printing devices 48 may implement a security feature that restricts the type of content in print data 38 that may be printed on that device. In this case, the printer selection process 30 may further eliminate devices 48 from selection based on content in print job 21A, such as determined by the separation process 22, which is restricted from printing on the device 48.

One or more other rankings 62 may be combined in any manner with the printer resource ranking 60. For example, the rankings may be combined in a predetermined serial manner, such as first selecting printers by availability, then the resulting set of available printers are selected according to their printer resource ranking 60, or vice-versa. The rankings may be combined in an additive manner by weighting the rankings, where the printer with the highest additive value might be selected. The rankings may be applied in different manners per printer based on a predefined set of rules. The rankings may alternatively be applied in parallel, where the final selection of printers is selected as either the intersection or union, and some conflict resolution (e.g., manual selection) when the number of remaining printers exceeds the desired number of printers. These are just examples and other combined ranking techniques can also be used.

Resource Downloading

Figure 5A:
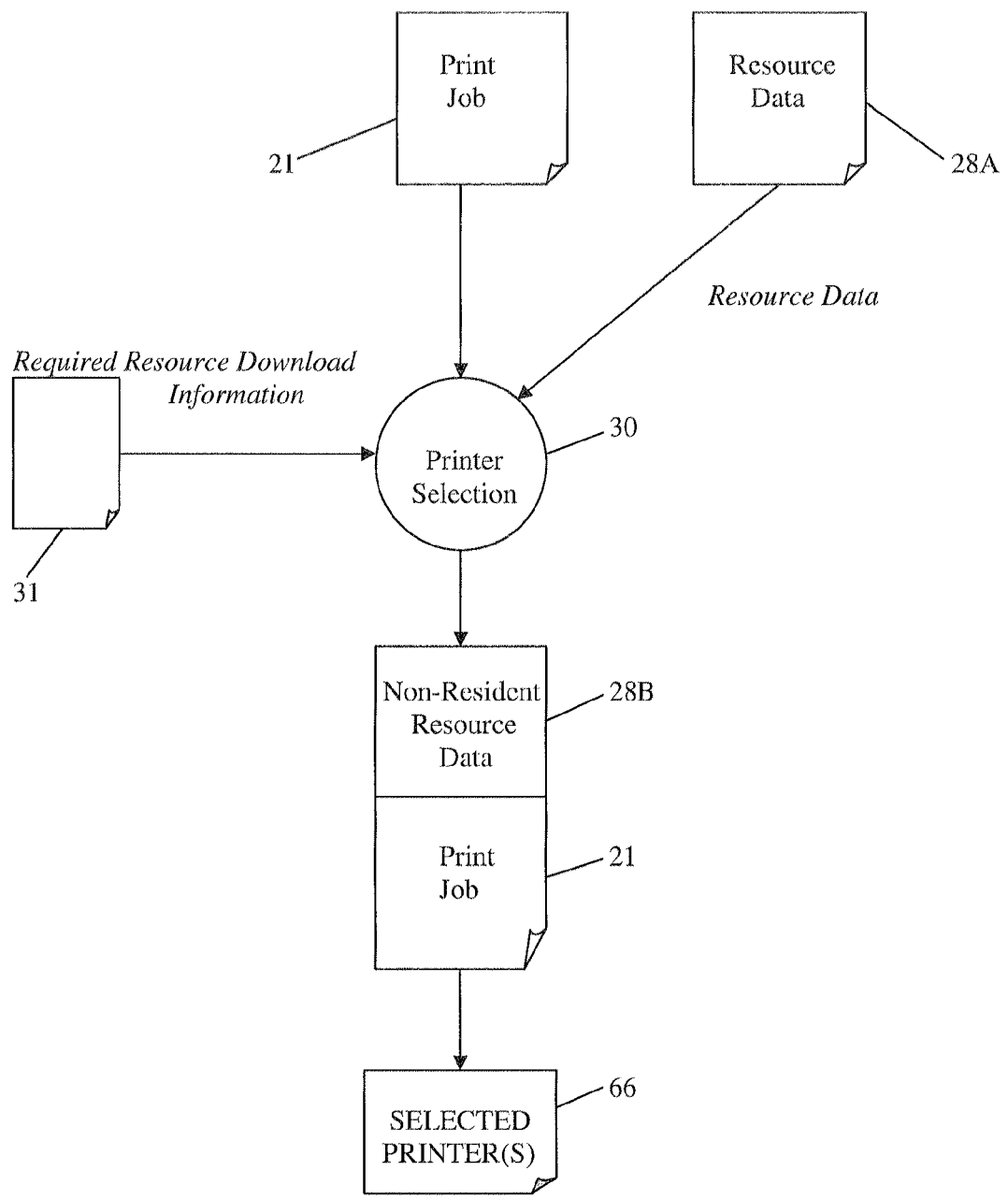
FIG. 5A is a diagram showing how resource data is downloaded with a print job.

FIG. 5A shows the despooling process for the printer or printer(s) that have been selected for the print job, or portions of the print job. Prior to, or as part of the print job 21, the resource data 28B not resident in the selected printer(s) 66 (non-resident resources) must be downloaded. This can happen in any manner. For example, the resource data 28A could be located on the client 40 (FIG. 2D), on a server 44, or on offline storage. The client 40 could access and embed the non-resident resource data 28B into the print job 21. Likewise, the client 40 could download the resource data 28B prior to despooling the print job 21. Alternately, a link could be embedded to the non-resident resource data 28B in print job 21, and the resource subsequently pulled by the selected printer(s) 66. Any process downstream from the printer selection process 30, such as a spooler, print processor, port monitor, could alternatively perform the resource data download.

Figure 5B:
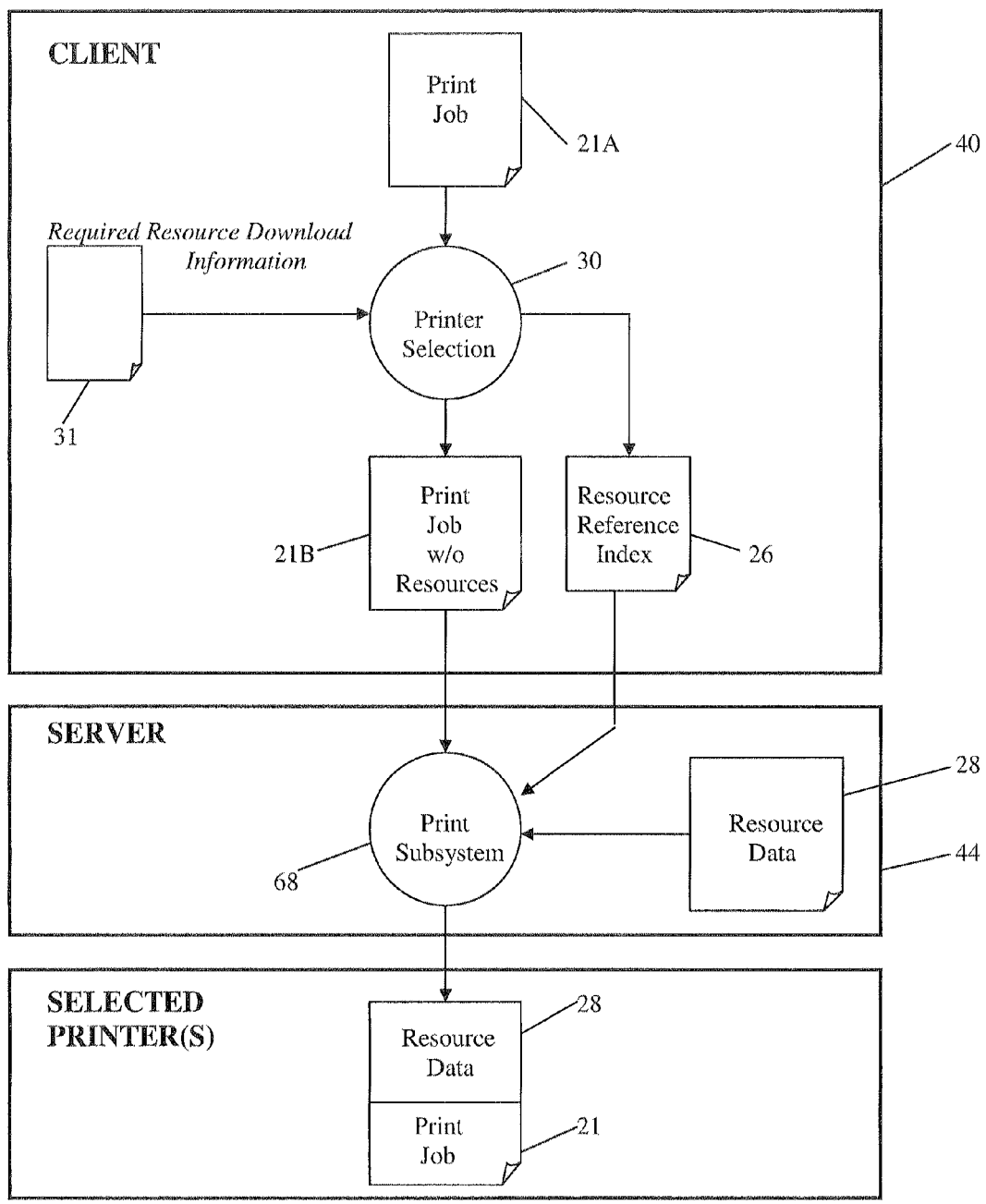
FIG. 5B is a diagram showing how a server downloads resource data for a print job.

FIG. 5B shows a distributed process where the print job 21B w/o resources is re-spooled from the client 40 to a print server 44 along with resource reference index 26. The print server 44 uses the resource reference index 26 to identify the resource data 28 that needs to be downloaded to the selected printing device. A component in the print server's print subsystem 68 (e.g., spooler, print processor, port monitor) then performs the resource download process.

Figure 5C:
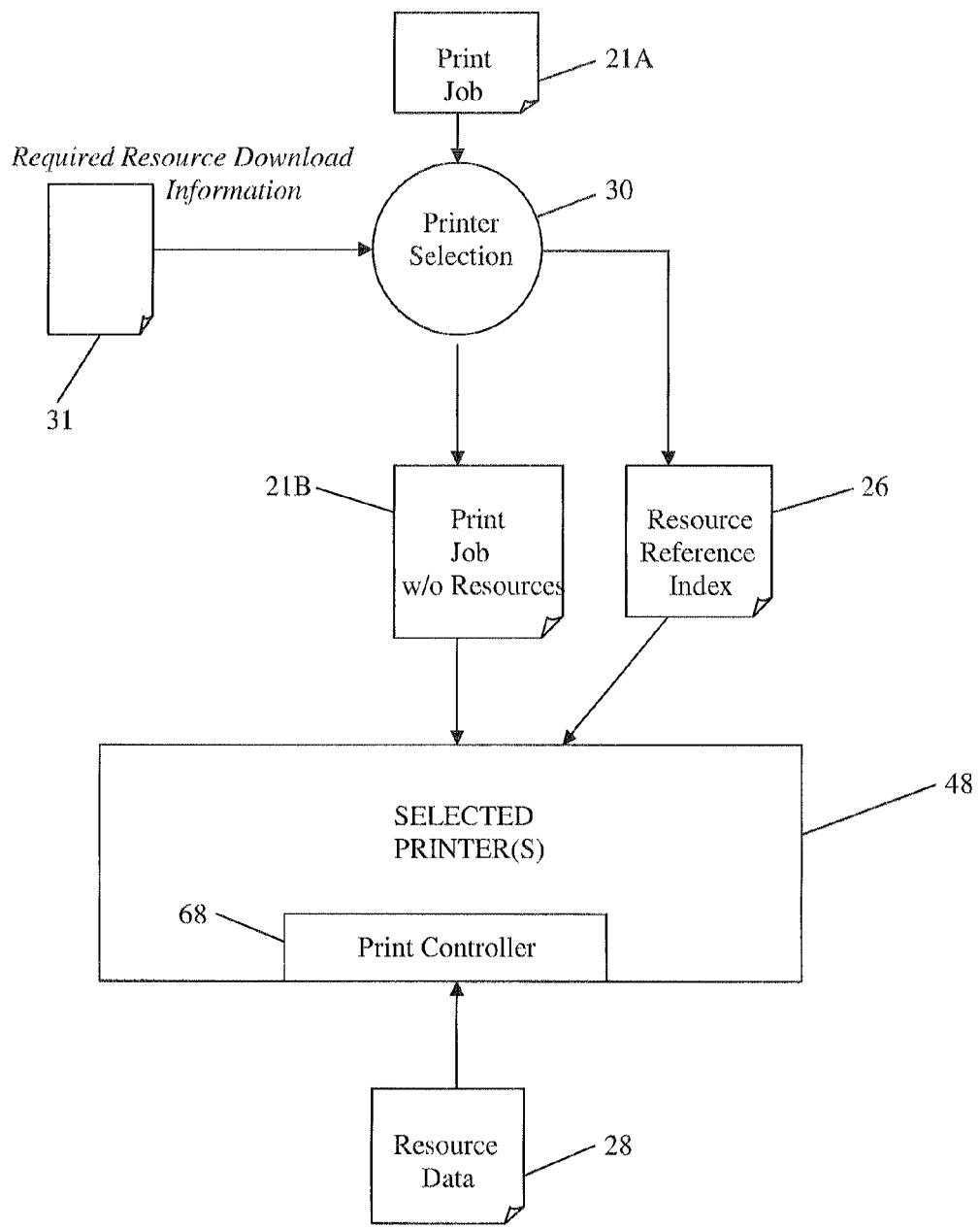
FIG. 5C is a diagram showing how resource data is pulled by a printer.

FIG. 5C shows another example where the print job 21B w/o resources is despooled to the selected printing device 48, along with resource reference index 26. A component in the printing device's print controller 68 uses the resource reference index 26 to identify and download the non-resident resource data 28. The resource data 28 may be downloaded from anywhere in the printing system such as from the client 40 (FIG. 2D), server 44, internet site, a memory device, some other printing device or from some other device.

Other Embodiments

Other embodiments include any imaging operations which use downloadable device resident resources, such as fax, scan, copy, and document management, such as document archive/retrieval, manipulation and transfer. Other embodiments include, but are not limited to, the spooling and despooling subsystems of the Microsoft Windows operating system, Apple MacIntosh Operating System, Linux Operating System, System V Unix Operating Systems, BSD Unix Operating Systems, OSF Unix Operating Systems, IBM Mainframe MVS Operating System, and IBM AS/400.

In some embodiments, the document/image data in its native format is converted to a format that is compatible with the imaging device (e.g., imaging driver). In other embodiments, the document/image data in its native format is supported by the imaging device (e.g., direct imaging).

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the invention can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for selecting one or more printing devices from a printing pool including at least a first printing device and a second printing device, the method comprising:
   identifying resources required in addition to print data for executing a print job, wherein the print job includes resource data commands and the print data;
   prior to a printer selection process, parsing and separating the print job to generate a resource reference index that identifies the resources to be used in the print job, wherein the separating preserves embedded resource data for performing the print job;
   identifying which of the resources in the resource reference index comprise resident and non-resident resources on each of the printing devices of the printing pool;
   determining a first time required for downloading a first set of the resource data commands by the first printing device;
   determining a second time required for downloading a second set of the resource data commands by the second printing device;
   assigning a composite rank to each of the printing devices according to respective download times and at least one of the following: device availability, device load, device performance, device capabilities, device locality, consumable status or cost;
   selecting one or more of the printing devices for printing the print job according to the ranking;
   after the selecting the one or more of the printing devices, removing at least one subset of the embedded resource data identified as resident on the selected one or more printing devices from the print job; and
   printing the print job with the one or more printing devices.

2. The method according to claim 1 wherein the first time and the second time are determined based on a time required for downloading only the non-resident resources on the selected one or more printing devices.

3. The method according to claim 2 including:
identifying a byte-size for the non-resident resources on each of the printing devices, wherein the printing devices are further ranked according to their identified byte size.

4. The method according to claim 2 including downloading the non-resident resources from a client device, server device, storage device, or from another printing device.

5. The method according to claim 1 including:
receiving the print job without the resources; and
sending the identified non-resident resources and the print job without the resources to the selected one or more printing devices.

6. The method according to claim 5, wherein the selecting and the sending are done by a single device.

7. The method according to claim 5, wherein the non-resident resources are sent from a server to the selected one or more printing devices.

8. A device, comprising:
means for identifying resources required for a print job used in printing data, according to resource data commands and print data included in the print job;
means for determining resource download requirements for each of a plurality of printing systems;
means for separating the resource data commands from the print data in the print job;
means for determining an amount of data associated with the resource download requirements for each of the plurality of printing systems;
means for assessing an availability of resident resources on each of the plurality of printing systems;
means for assessing the plurality of printing systems according to download time required for downloading one or more non-resident resources for printing the print job;
means for splitting the print job into separate portions; and
means for ranking the plurality of printing systems with respect to each print job portion at least according to resource availability and download time, and wherein each of the separate portions are printed by different printing systems according to the printing system ranking.

9. The device according to claim 8 further comprising:
means for sending the print job to the different printing systems, wherein the different printing systems only download non-resident resources that do not already reside on the different printing systems.

10. The device according to claim 8 further comprising means for parsing and separating the print job to generate a resource reference index that ascertains the resources to be used in the print job, wherein the separating removes embedded resource data from the print job.

11. The device according to claim 10 further comprising means for sending the resource reference index to a second device, wherein the non-resident resources are downloaded from the second device to the different printing systems.

12. The device according to claim 8 further comprising:
means for querying the plurality of printing systems to determine the resident resources;
means for comparing the resident resources of each of the plurality of printing systems with the resources required for the print job; and
means for generating an associated list of required download resources for each of the plurality of printing systems, wherein the required download resources include those resources which are not resident resources.

13. The device according to claim 8 further comprising:
means for identifying which of the plurality of printing systems requires a smallest amount of data to download for each of the print job portions;
means for calculating an amount of time each of the plurality of printing systems would need to access the required download resources for each of the print job portions; and
means for serially ranking each of the plurality of printing systems for each of the print job portions first according to at least one of the following: device availability, device load, device performance, device capabilities, device locality, consumable status or cost, and then according to the amount of time needed to access the required download resources, wherein a selected printing system is associated with a first highest ranking corresponding to at least one of the following: the device availability, the device load, the device performance, the device capabilities, the device locality, the consumable status or the cost, and second according to a smallest amount of time to access the required download resources.

14. The device according to claim 13, wherein the resident resources are stored on different types of tangible memory in the plurality of printing systems.

15. The device according to claim 8, wherein the resources include fonts, forms, overlays, watermarks, logos, half-tone patterns, color profiles, color calibration, biometric information, or digital signatures.

16. The device according to claim 8
wherein a security level associated with the print job is used as at least one criteria for selecting a printing system.

17. A printing system, comprising:
a client configured to generate a print job having associated software resources and print data used for printing the print job;
multiple printers for printing the print job according to a rank assigned by a server; and the server configured to:
receive a reference index identifying the software resources used for printing the print job, wherein the reference index identifies resources to be used in the print job extracted from the print job;
separate the software resources from the print data;
determine which resident resources on the multiple printers correspond with the software resources for printing the print job;
determine which of the software resources are non-resident resources on one or more of the multiple printers;
identify a byte-size corresponding to the non-resident resources on each of the one or more printers;
assign a composite rank to each of the multiple printers according to respective download times for downloading the software resources that are not resident, the byte size corresponding to the non-resident resources on each of the one or more printers, and at least one of the following: device availability, device load, device performance, device capabilities, device locality, consumable status or cost;
select one of the multiple printers for printing the print job according to the composite rank; and
download the non-resident resources to the selected printer, wherein the non-resident resources comprise fewer resources than those identified in the reference index.

18. An image operations device comprising:
- means for parsing and separating a print job to generate a resource reference index that identifies resources to be used in the print job;
- means for determining which resources identified in the index to be used for printing the print job are non-resident resources on each available printing device in a printer pool;
- means for estimating a non-resident resource byte-size for each available printing device in the printer pool;
- means for determining a first times required for downloading the non-resident resources by each printing device in the printer pool wherein the download times are based on the byte size of the corresponding non-resident resources;
- means for assigning the each printing device in the printer pool a first composite rank according to at least one of the following: device availability, device load, device performance, device capabilities, device locality, consumable status or cost;
- means for assigning each printing device in the printer pool a second composite rank according to their respective download times and an additional printer resource metric;
- means for selecting one of the printing devices in the printer pool, to optimize for either the first or second ranking, for printing the print job; and
- means for removing embedded resource data from the print job wherein the embedded data includes resource data commands for resources that are resident on the printer selected for printing the print job.

* * * * *